US011359994B2

(12) United States Patent
Ream et al.

(10) Patent No.: US 11,359,994 B2
(45) Date of Patent: Jun. 14, 2022

(54) LASER BEAM PROFILING SYSTEM FOR USE IN LASER PROCESSING SYSTEMS

(71) Applicant: Edison Welding Institute, Inc., Columbus, OH (US)

(72) Inventors: Stanley L. Ream, Columbus, OH (US); Craig T. Walters, Powell, OH (US); Jacob Hay, Circleville, OH (US)

( * ) Notice: Subject to any disclaimer, the term of this patent is extended or adjusted under 35 U.S.C. 154(b) by 0 days.

(21) Appl. No.: 17/226,776

(22) Filed: Apr. 9, 2021

(65) Prior Publication Data

US 2021/0223140 A1 Jul. 22, 2021

Related U.S. Application Data

(63) Continuation-in-part of application No. 16/814,313, filed on Mar. 10, 2020, now Pat. No. 10,976,219, (Continued)

(51) Int. Cl.
| | |
|---|---|
| *G01J 3/02* | (2006.01) |
| *G01M 11/00* | (2006.01) |
| *B29C 64/153* | (2017.01) |
| *B29C 64/273* | (2017.01) |
| *B22F 10/20* | (2021.01) |
| *B22F 10/00* | (2021.01) |
| *B22F 10/30* | (2021.01) |
| *B22F 10/10* | (2021.01) |

(52) U.S. Cl.
CPC .............. *G01M 11/33* (2013.01); *B22F 10/00* (2021.01); *B22F 10/20* (2021.01); *B29C 64/153* (2017.08); *B29C 64/273* (2017.08); *B22F 10/10* (2021.01); *B22F 10/30* (2021.01)

(58) Field of Classification Search
CPC ......... G01M 11/33; B22F 10/00; B22F 10/20; B22F 10/10; B22F 10/30; B22F 10/31; B29C 64/153; B29C 64/273; B29C 64/393; Y02P 10/25; B33Y 30/00; B33Y 40/00; B33Y 50/02; B33Y 10/00
See application file for complete search history.

(56) References Cited

U.S. PATENT DOCUMENTS

2010/0157086 A1* 6/2010 Segale ............... G01N 21/6428
348/222.1

* cited by examiner

*Primary Examiner* — Abdullahi Nur

(57) ABSTRACT

A testing apparatus for use with a laser processing system that includes a laser for generating a non-stationary laser beam and a work plane positioned at a working distance relative to the non-stationary laser beam, wherein the testing apparatus includes a support tube; a protective window mounted in the support tube for protecting components mounted within the support tube; a reimaging lens mounted in the support tube for enlarging the non-stationary laser beam for characterization thereof; a pin-hole defining structure mounted in the support tube for receiving laser light generated by the laser beam, wherein the pin-hole is located at a predetermined distance from the reimaging lens; a fiber optic cable disposed within the pin-hole defining structure that has a proximal end at which the laser light is received through the pin-hole and a distal end to which the laser light is delivered; and a photodetector located at the distal end of the fiber optic cable that converts the laser light delivered to the photodetector into electrical voltage output signals based on intensity of the laser light received through the pin-hole.

19 Claims, 13 Drawing Sheets

Related U.S. Application Data which is a continuation of application No. 16/368,968, filed on Mar. 29, 2019, now Pat. No. 10,627,311.

(60) Provisional application No. 62/650,421, filed on Mar. 30, 2018.

SECTION B-B

LASER BEAM PROFILING SYSTEM FOR USE IN LASER PROCESSING SYSTEMS

CROSS-REFERENCE TO RELATED APPLICATIONS

This patent application is a continuation-in-part of U.S. patent application Ser. No. 16/814,313 filed on Mar. 10, 2020 and entitled "Laser Beam Profiling System for Use in Laser Powder Bed Fusion Manufacturing" (now U.S. Pat. No. 10,976,219), which was a continuation of U.S. patent application Ser. No. 16/368,968 filed on Mar. 29, 2019 and entitled "Laser Beam Profiling System for Use in Laser Powder Bed Fusion Manufacturing" (now U.S. Pat. No. 10,627,311), which claimed the benefit of U.S. Provisional Patent Application No. 62/650,421 filed on Mar. 30, 2018 and entitled "Multi-Location Laser Beam Characterization System and Device for L-PBF", the disclosures of which are hereby incorporated by reference herein in their entirety and made part of the present U.S. utility patent application for all purposes.

BACKGROUND

The disclosed technology relates in general to laser systems having high speed motion capability and more specifically to systems, devices, and methods for characterizing, analyzing, and verifying proper functioning and performance of lasers used in laser processing systems having high speed motion capability.

Laser processing typically includes using a laser beam to modify a work piece in a predetermined manner. Laser processing ranges from high-intensity laser ablation processes to significantly lower intensity processes such as heat treating, in which melting is avoided. Nearly all laser processing techniques involve forming the laser beam into a specific size and shape at a particular location or working distance from the laser system. Precise identification of the location where a laser system will create a focal spot having the desired characteristics is an important aspect of creating an efficient and optimized laser process.

Laser processing techniques include laser beam welding (LBW), which is a fusion welding process used to join materials in various configurations. Laser beam welding systems typically include a laser light source, a laser light delivery system, an optical arrangement for delivering laser the light to a work piece, and frequently a motion system for moving either the laser or the work piece. LBW systems may include fiber-delivered beams or open beam paths, fixed optical systems or galvanometer systems that allow for rapid deflection of the laser beam. Mechanical motion systems may include high-speed systems or low-speed systems depending on intended application. For the LBW process, laser light is focused using optical arrangements that include a collimation lens that stops the divergence of the laser light from the light source and delivers the light to a focusing lens. The focusing lens then directs the high-intensity, focused laser light to the work piece that is to be welded. The high-intensity laser light is then used to melt the material of the work piece and fuse two or more parts or components together.

The use of laser processing systems, particularly LBW systems, in manufacturing has become common and such systems can be found in many manufacturing facilities worldwide. The functional success of all laser processing systems depends on predetermined, stable, and repeatable laser beam characteristics including focal spot shape, distribution, and location. Accordingly, there is an ongoing need for accurate, easy to use, and affordable systems, devices, and methods for analyzing the quality and dynamic accuracy of laser focal spots formed by laser processing systems having motion capability.

SUMMARY

The following provides a summary of certain example implementations of the disclosed inventive subject matter. This summary is not an extensive overview and is not intended to identify key or critical aspects or elements of the disclosed inventive subject matter or to delineate its scope. However, it is to be understood that the use of indefinite articles in the language used to describe and claim the disclosed inventive subject matter is not intended in any way to limit the described inventive subject matter. Rather the use of "a" or "an" should be interpreted to mean "at least one" or "one or more".

One implementation provides a first testing apparatus for use with a laser processing systems, wherein the laser system includes a laser for generating a non-stationary laser beam and a work plane positioned at a working distance relative to the non-stationary laser beam, and wherein the testing apparatus comprises a support tube; a light-transmitting protective window mounted in an upper portion of the support tube for protecting components mounted within the support tube; a reimaging lens mounted in a middle portion of the support tube for enlarging the non-stationary laser beam for measurement thereof; a pin-hole defining structure mounted in a lower portion of the support tube for receiving laser light generated by the non-stationary laser beam, wherein the pin-hole is located at a predetermined distance from the reimaging lens, and wherein the predetermined distance is calibrated to permit analysis of the laser beam; a fiber optic cable disposed within the pin-hole defining structure, wherein the fiber optic cable has a proximal end at which the laser light is received through the pin-hole and a distal end to which the laser light is delivered; and a photodetector located at the distal end of the fiber optic cable, wherein the photodetector converts the laser light delivered to the photodetector into electrical voltage output signals based on intensity of the laser light received through the pin-hole.

The testing apparatus may further comprise a fixed or an adjustable mounting device adapted to receive the support tube and reposition the support tube on the work plane. The testing apparatus may further comprise a data acquisition device in communication with the photodetector, wherein the data acquisition device receives, saves, organizes, and analyzes the electrical signals as a function of time, or time and position, relative to the pin-hole through which the laser light was received. The testing apparatus may further comprise a data analysis algorithm associated with the data acquisition device that calculates and determines laser beam quality based on data acquired from multiple passes of the non-stationary laser beam over the pin-hole. The pin-hole may have a diameter that is one third to one-thirtieth the diameter of the laser beam being characterized. The pin-hole defining structure may include at least one highly-reflective material for minimizing damage to the pin-hole and pin-hole defining structure caused by absorption of energy from the laser. The at least one highly-reflective material may include gold, copper, or other reflective metal.

Another implementation provides a second testing apparatus for use with a laser processing systems, wherein the laser system includes a laser for generating a non-stationary laser beam and a work plane positioned at a working distance relative to the non-stationary laser beam, and wherein the testing apparatus comprises at least one support tube; a light-transmitting protective window mounted in an upper portion of each support tube for protecting components mounted within the support tube; a reimaging lens mounted in a middle portion of each support tube for enlarging the non-stationary laser beam for measurement thereof; a pin-hole defining structure mounted in a lower portion of each support tube for receiving laser light generated by the non-stationary laser beam, wherein the pin-hole is located at a predetermined distance from the reimaging lens, and wherein the predetermined distance is calibrated to permit analysis of the laser beam; a fiber optic cable disposed within each pin-hole defining structure, wherein the fiber optic cable has a proximal end at which the laser light is received through the pin-hole and a distal end to which the laser light is delivered; a photodetector located at the distal end of each fiber optic cable, wherein the photodetector converts the laser light delivered to the photodetector into electrical voltage output signals based on intensity of the laser light received through each pin-hole; and an adjustable mounting device adapted to receive each support tube and reposition the support tube on the work plane.

The testing apparatus may further comprise a data acquisition device in communication with the photodetector, wherein the data acquisition device receives, saves, organizes, and analyzes the electrical signals as a function of time, or time and position, relative to the pin-hole through which the laser light was received. The testing apparatus may further comprise a data analysis algorithm associated with the data acquisition device that calculates and determines laser beam quality based on data acquired from multiple passes of the non-stationary laser beam over each pin-hole. Each pin-hole may have a diameter that is one third to one-thirtieth the diameter of the laser beam being characterized. Each pin-hole defining structure may include at least one highly-reflective material for minimizing damage to the pin-hole and pin-hole defining structure caused by absorption of energy from the laser. The at least one highly-reflective material may include gold, copper, or other reflective metal.

Still another implementation provides a third testing apparatus for use with a laser processing systems, wherein the laser system includes a laser for generating a non-stationary laser beam and a work plane positioned at a working distance relative to the non-stationary laser beam, and wherein the testing apparatus comprises at least one support tube; a light-transmitting protective window mounted in an upper portion of each support tube for protecting components mounted within the support tube; a reimaging lens mounted in a middle portion of each support tube for enlarging the non-stationary laser beam for measurement thereof; a pin-hole defining structure mounted in a lower portion of each support tube for receiving laser light generated by the non-stationary laser beam, wherein the pin-hole is located at a predetermined distance from the reimaging lens, and wherein the predetermined distance is calibrated to permit analysis of the laser beam; a fiber optic cable disposed within each pin-hole defining structure, wherein the fiber optic cable has a proximal end at which the laser light is received through the pin-hole and a distal end to which the laser light is delivered; a photodetector located at the distal end of each fiber optic cable, wherein the photodetector converts the laser light delivered to the photodetector into electrical voltage output signals based on intensity of the laser light received through each pin-hole; and a data acquisition device in communication with each photodetector, wherein the data acquisition device receives, saves, organizes, and analyzes the electrical signals as a function of time, or time and position, relative to the pin-hole through which the laser light was received.

The testing apparatus may further comprise a fixed or an adjustable mounting device adapted to receive each support tube and reposition the support tube on the work plane. The testing apparatus may further comprise a data analysis algorithm associated with the data acquisition device that calculates and determines laser beam quality based on data acquired from multiple passes of the non-stationary laser beam over each pin-hole. Each pin-hole may have a diameter that is one third to one-thirtieth the diameter of the laser beam being characterized. Each pin-hole defining structure may include at least one highly-reflective material for minimizing damage to the pin-hole and pin-hole defining structure caused by absorption of energy from the laser. The at least one highly-reflective material may include gold, copper, or other reflective metal.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed inventive subject matter and, together with the general description given above and detailed description given below, serve to explain the principles of the disclosed subject matter, and wherein.

DETAILED DESCRIPTION

Figure 1:
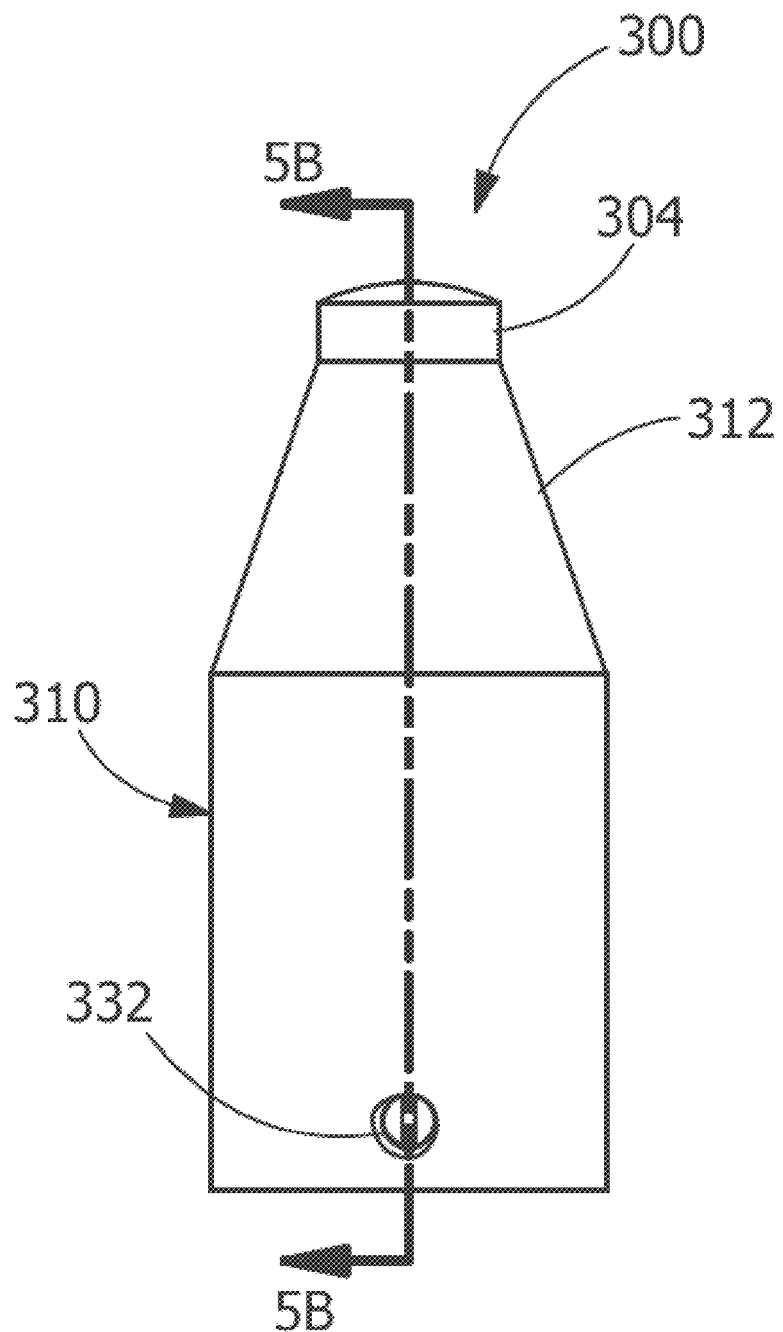
FIG. 1 is a front view of a pin-hole defining structure referred to herein as a "pedestal", in accordance with an example implementation of the disclosed systems and devices, shown in an assembled state.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed inventive subject matter. Accordingly, the following implementations are set forth without any loss of generality to, and without imposing limitations upon, the claimed subject matter.

As previously stated, the present invention provides systems, devices, and methods for profiling or characterizing the beam of a laser used in a laser processing system. The disclosed systems and devices provide a portable testing apparatus that is adapted to be located within the work area of a laser processing system, wherein the laser processing system includes at least one laser that generates a non-stationary laser beam having known or predetermined characteristics, a work plane positioned at a predetermined working distance relative to the non-stationary laser beam, wherein the non-stationary laser beam translates (i.e., traverses) across the work plane in a controlled manner during a laser process.

Figure 2:
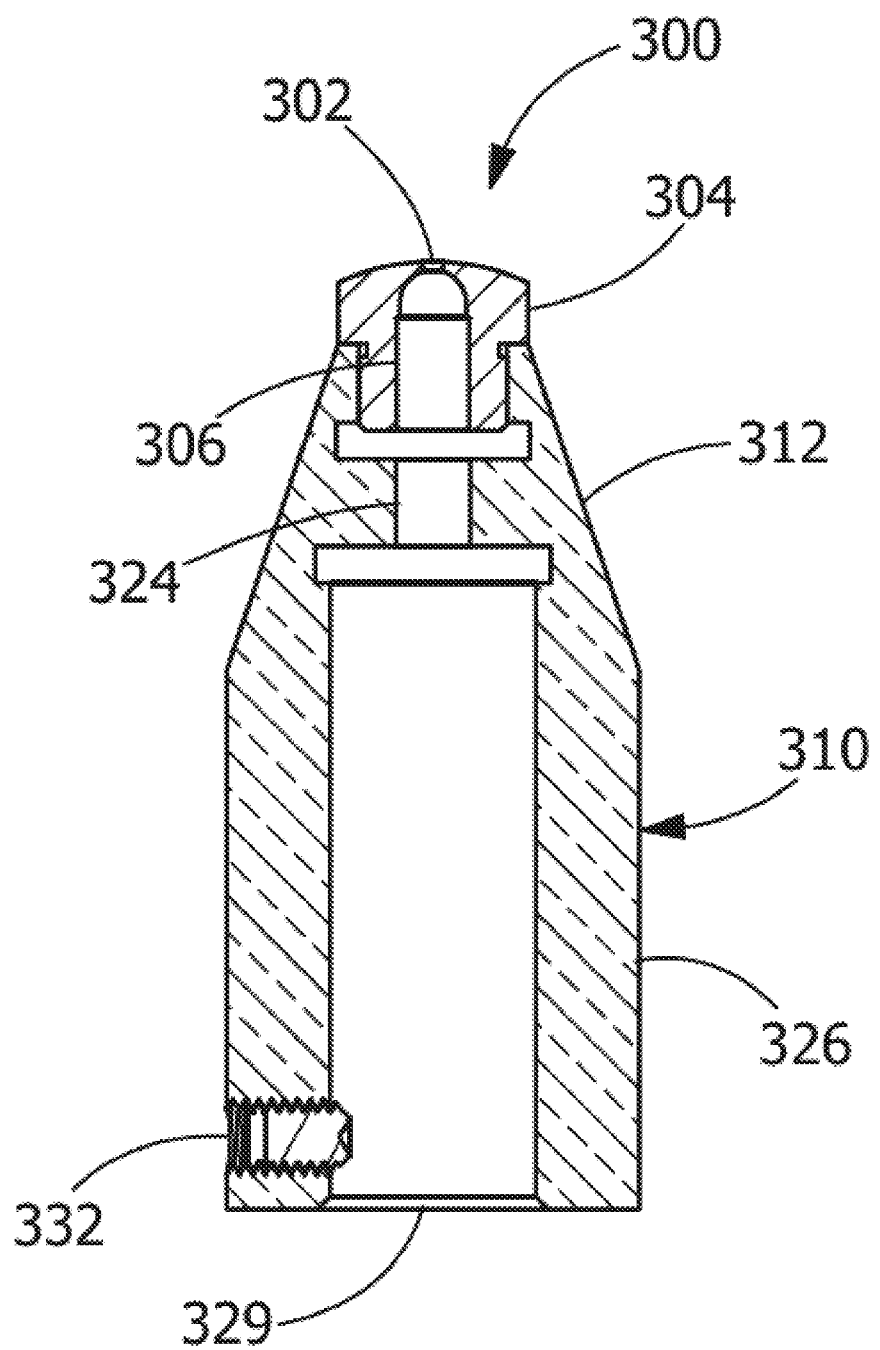
FIG. 2 is a cross-sectional view of the pin-hole defining structure (pedestal) of FIG. 1.
Figure 3:
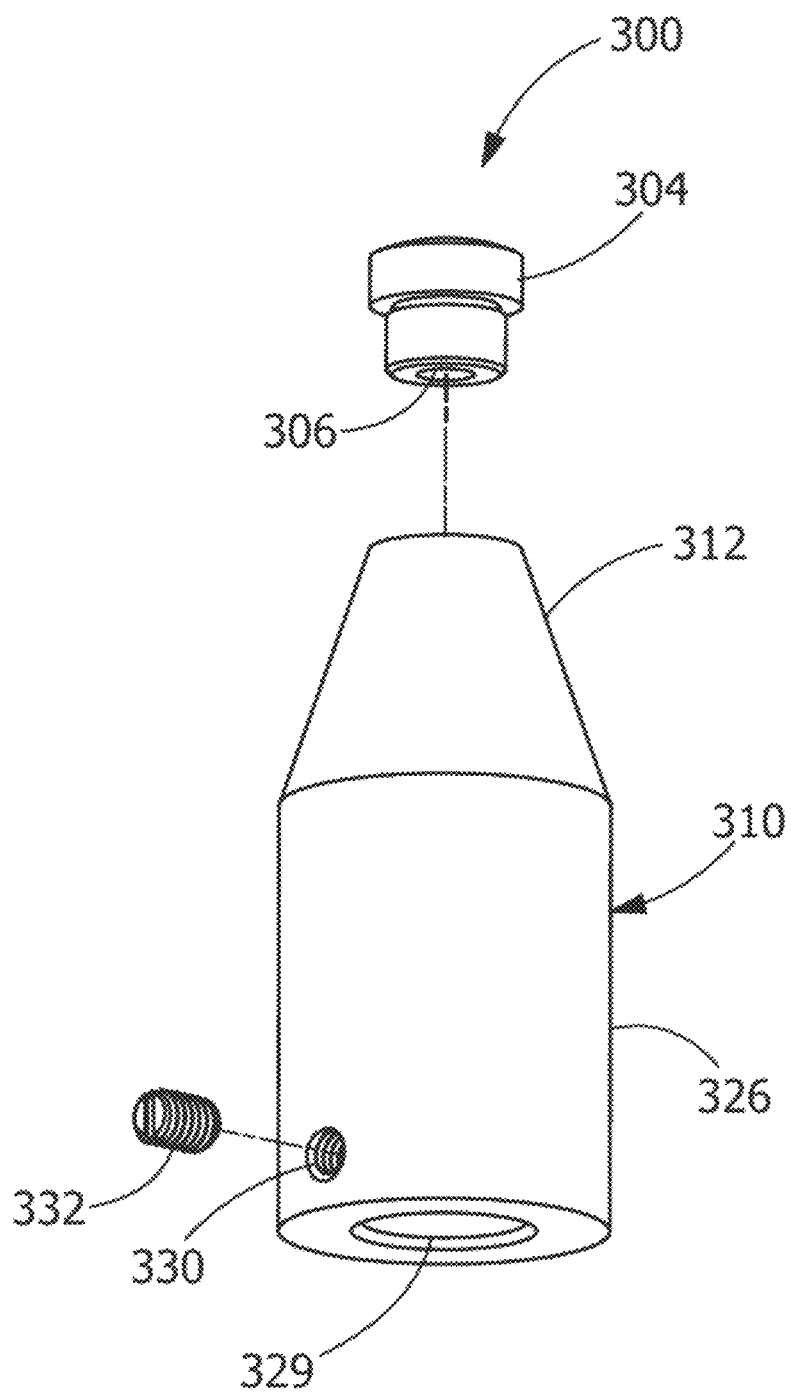
FIG. 3 is an exploded perspective view of the pin-hole defining structure (pedestal) of FIG. 1.
Figure 4:
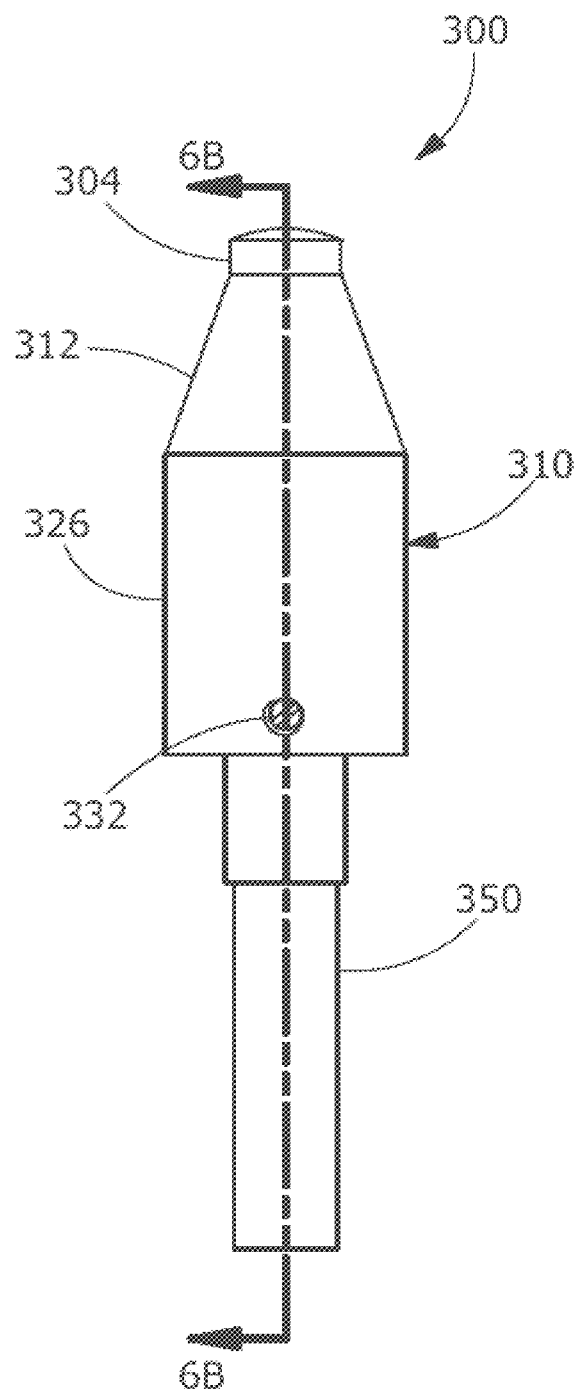
FIG. 4 is a front view of a pin-hole defining structure (pedestal), in accordance with an example implementation of the disclosed systems and devices, wherein a fiber optic cable has been inserted into the pin-hole defining structure (pedestal)
Figure 5:
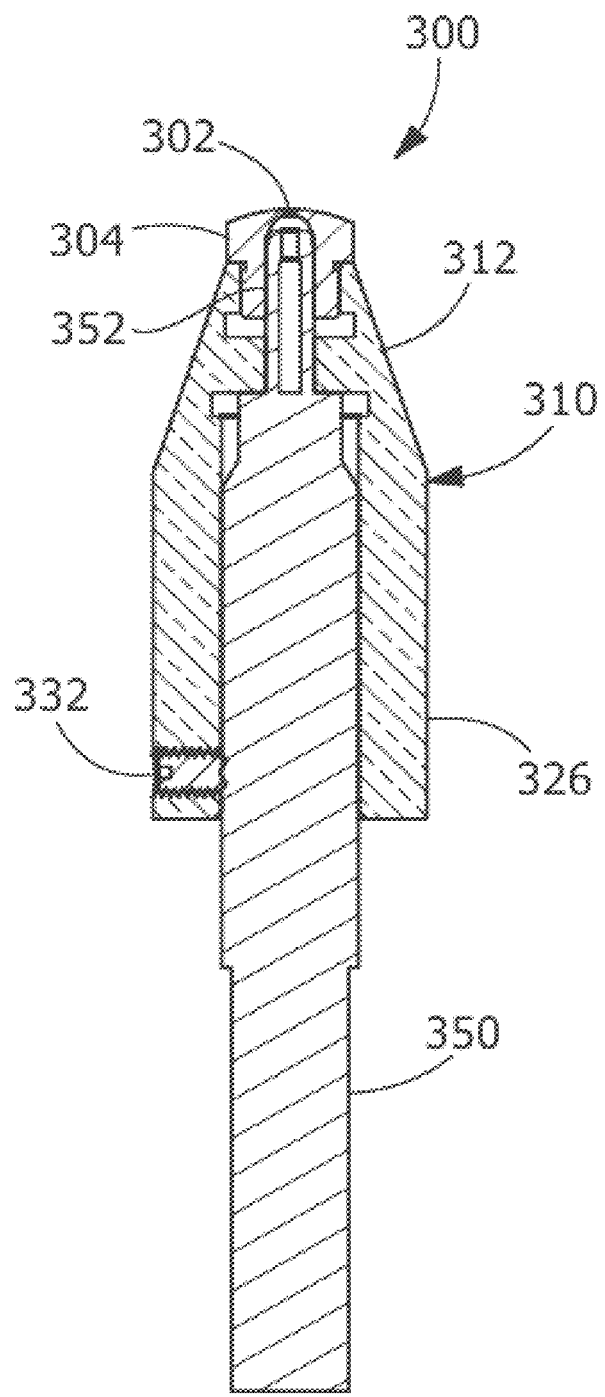
FIG. 5 is a cross-sectional view of the pin-hole defining structure (pedestal) and fiber optic cable assembly shown in FIG. 4.
Figure 6:
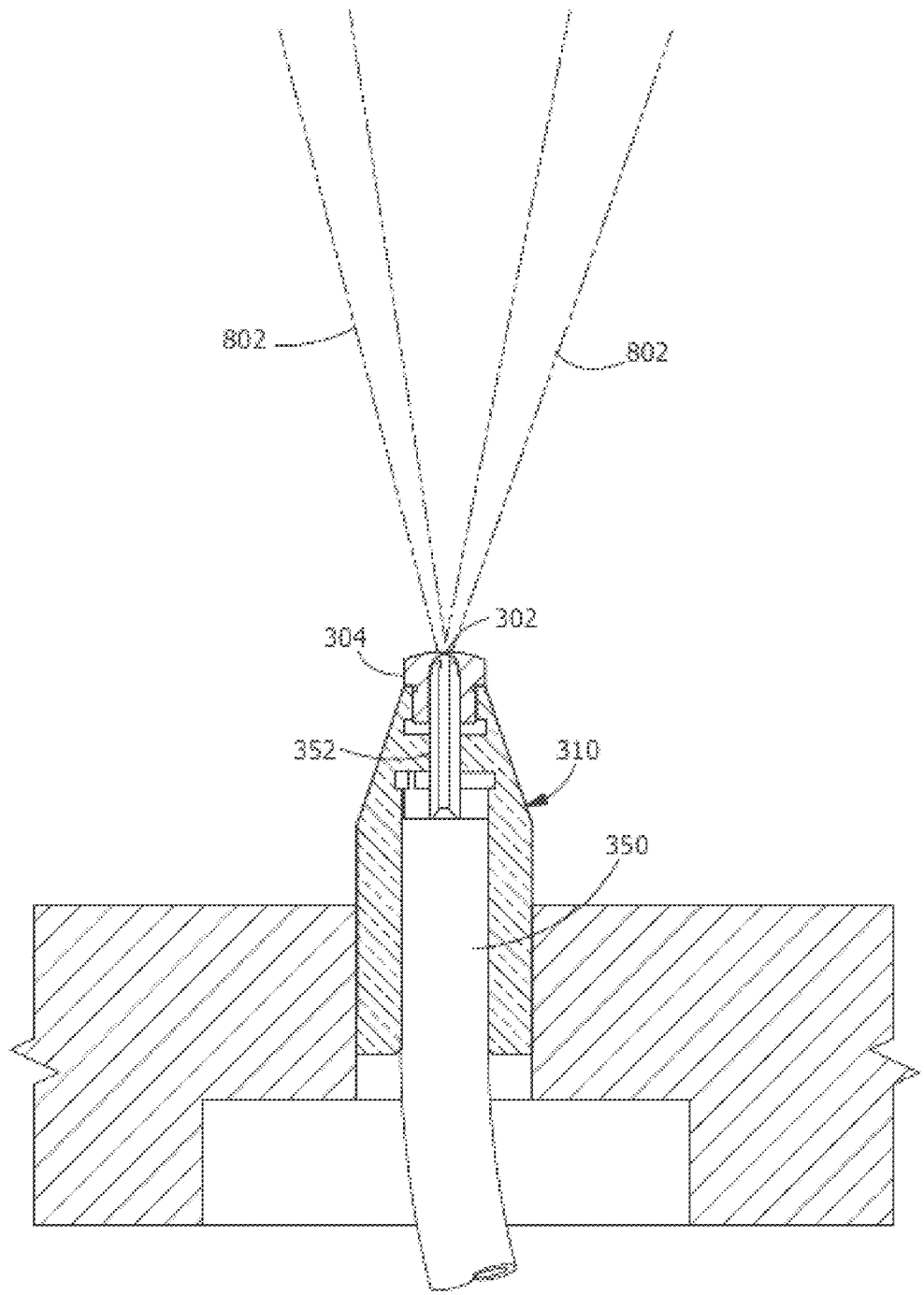
FIG. 6 is a cross-sectional view of one of the disclosed pin-hole defining structures shown mounted in a support and receiving laser light from a laser beam being analyzed by a testing apparatus.
Figure 7:
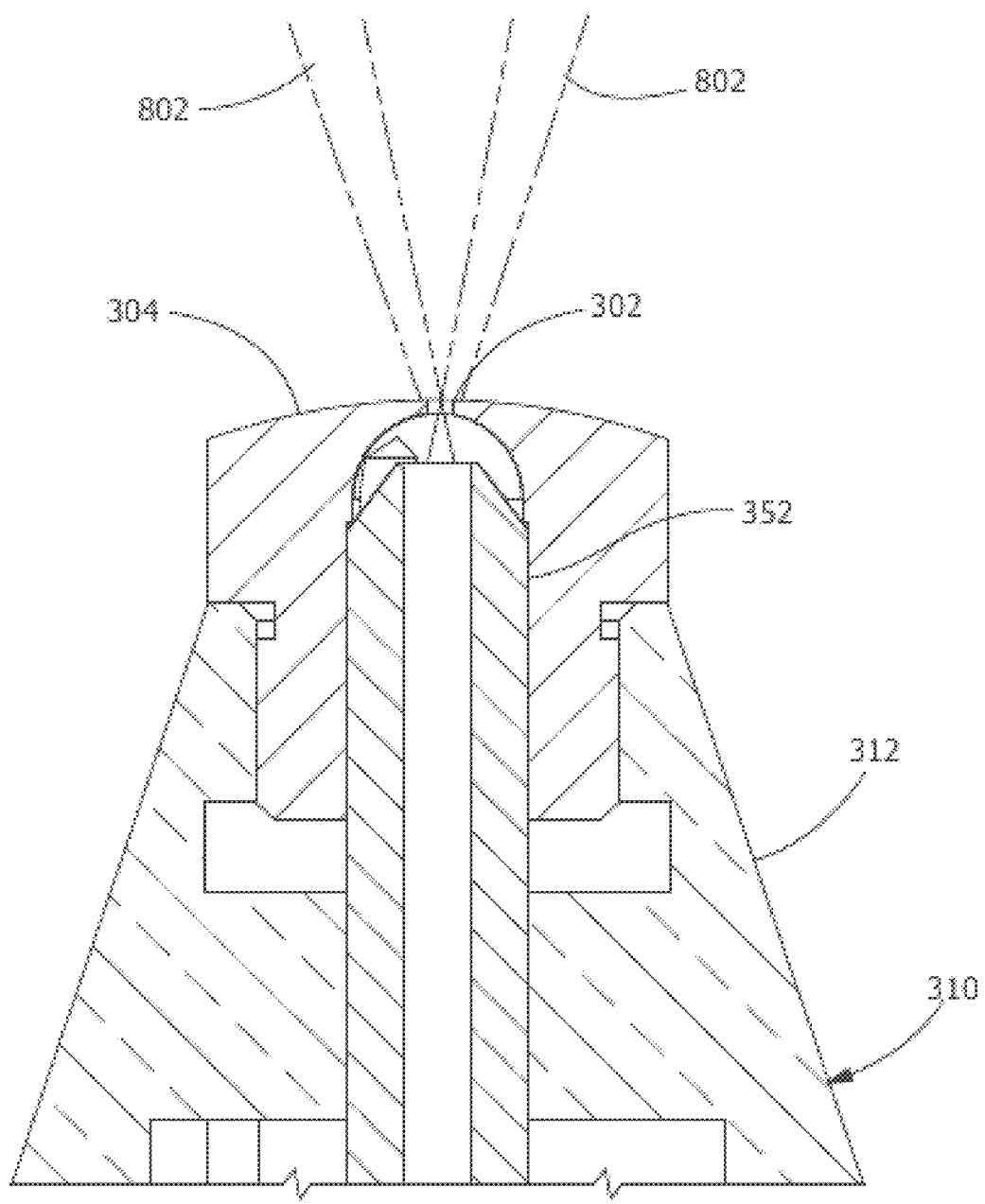
FIG. 7 is a detail of the upper portion of FIG. 6 showing a portion of the laser light passing through a pin-hole and the remaining laser light being reflected by the pin-hole defining structure.

With reference to the Figures, FIG. 1 provides a front view of a pin-hole defining structure referred to herein as a "pedestal", in accordance with an example implementation of the disclosed systems and devices, shown in an assembled state. FIG. 2 provides is a cross-sectional view of the pin-hole defining structure (pedestal) of FIG. 1. FIG. 3 provides an exploded perspective view of the pedestal of FIG. 1. FIG. 4 provides a front view the pedestal, wherein a fiber optic cable has been inserted into the pin-hole defining structure. FIG. 5 provides a cross-sectional view of the pedestal and fiber optic cable assembly shown in FIG. 4. FIG. 6 provides a cross-sectional view of the pedestal shown mounted in a support and receiving laser light from a laser beam being analyzed by a testing apparatus. FIG. 7 provides a detail of the upper portion of FIG. 6 showing a portion of the laser light passing through a pin-hole and the remaining laser light being reflected by the pin-hole defining structure.

Figure 12:
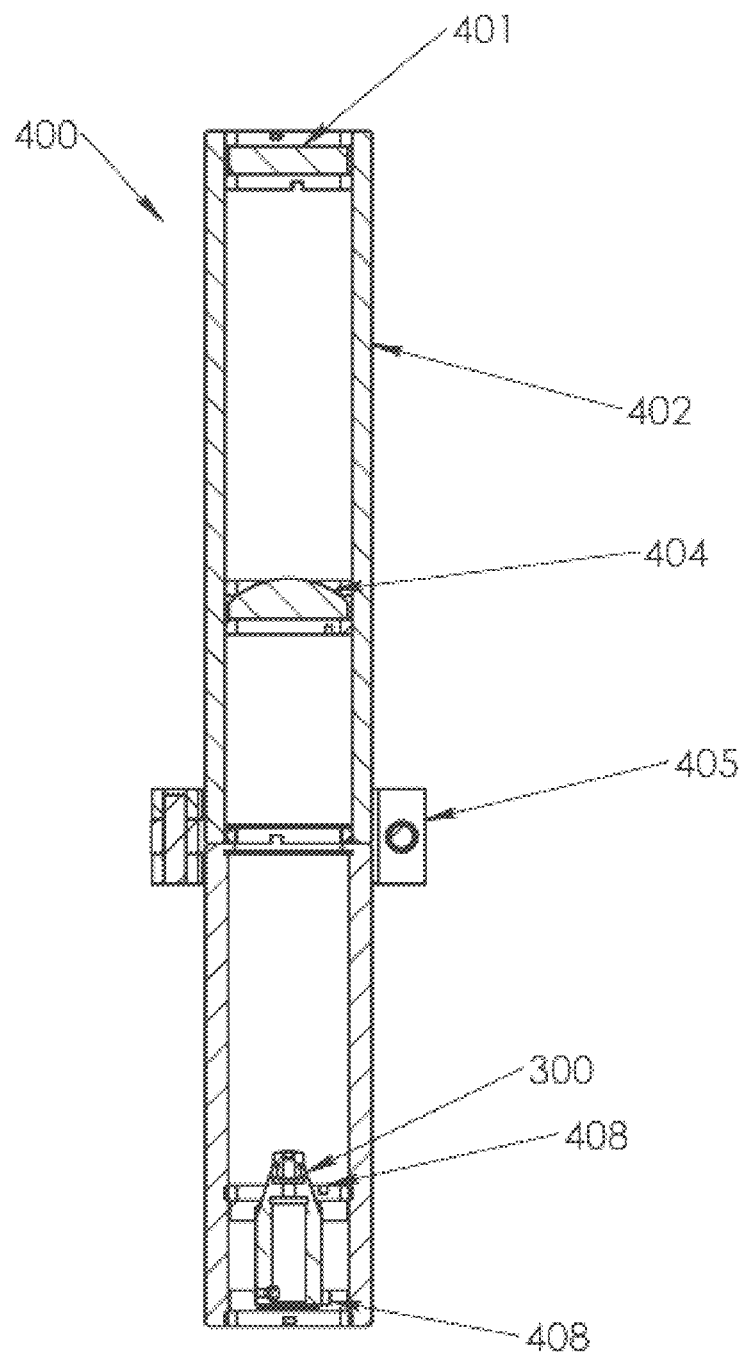
FIG. 12 is a cross sectional view of the testing apparatus of FIG. 11 showing the pin-hole defining structure and associated components disposed within the testing apparatus.

As shown in FIGS. 1-5, pin-hole defining structure or pedestal 300 includes pin-hole 302, which is formed in tip 304 through which channel 306 passes. The diameter of pin-hole 302 is typically one third to one-thirtieth the diameter of the laser beam being characterized by testing apparatus 400 (e.g., pinhole diameter: 5-50 μm). Tip 304 typically includes a highly reflective material such as gold, copper, or other reflective metal for minimizing damage to the pin-hole and pedestal caused by absorption of energy from the laser beam. Tip 304 is mounted within body 310 which includes tapered portion 312 and cylindrical portion 326 through which channel 329 passes. Set screw aperture 330 is adapted to receive set screw 332 which secures fiber optic cable 350 in body 310. The proximal end of optical fiber 352 is inserted into channel 306 and brought into close proximity with pin-hole 302. As shown in FIG. 12, pedestal 300 is mounted within support tube 402 such that pin-hole 302 is located at a known distance (e.g. 56 mm) from reimaging lens 404. This configuration provides for a known reimaging magnification and permits evaluation of the laser beam diameter.

Figure 10:
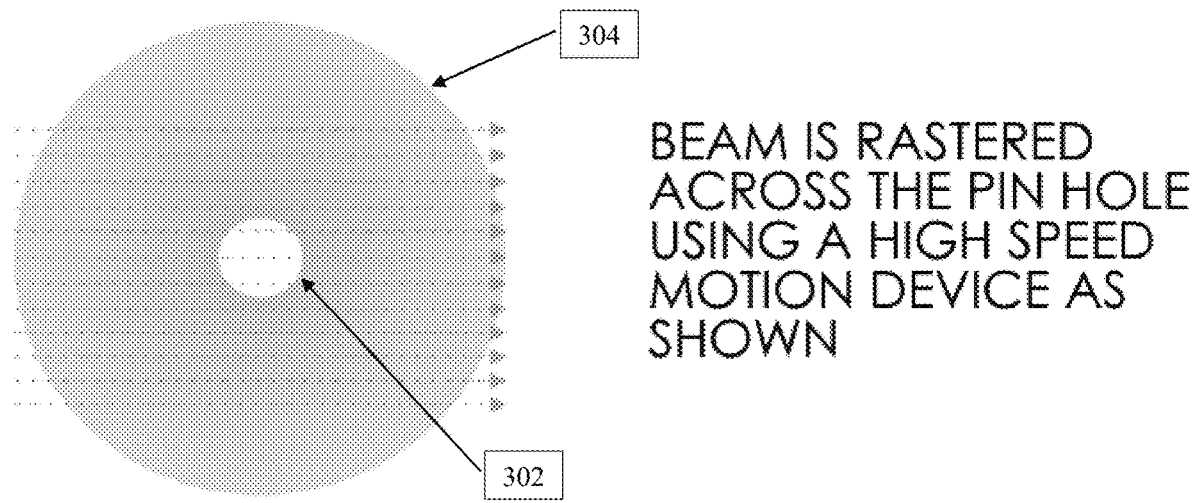
FIG. 10 is a diagram depicting an example laser beam path created or performed by the motion system or beam manipulation system associated with a laser processing system for allowing the disclosed testing apparatus to analyze the laser beam generated by the laser processing system.

FIG. 6 provides a cross-sectional view of pin-hole defining structure 300 shown mounted in a support and receiving laser light from laser beam 802 during normal operation of a laser processing system being analyzed. FIG. 7 is a detail of the upper portion of FIG. 6 showing the laser light being reflected by tip 304. FIG. 10 depicts testing apparatus 400, which contains pin-hole defining structure 300, being used to analyze the characteristics of non-stationary laser beam 802 being generated by laser source 800. In FIGS. 6-7, light from laser beam 802 is shown passing through pin-hole 302 and entering optical fiber 352, through which the signal is transmitted to photodetector 700 (see FIG. 13). The laser light that passes through pin-hole 302 is only a small amount of the laser light generated by laser beam 802. For example, for a laser beam having a total diameter of about 0.1 mm, the diameter of the portion of the beam that passes though pin-hole 302 would be about 0.025 mm. Laser light collected from the pin-hole may be transmitted to one or more light measuring devices through fiber optic coupling. Testing apparatus 400 includes a data acquisition device in communication with photodetector 700. The data acquisition device receives, saves, organizes, and analyzes electrical signals as a function of time, or time and position, relative to the pin-holes through which the laser light was received. A data analysis algorithm associated with the data acquisition device calculates and determines laser beam quality based on data acquired from multiple passes of the non-stationary laser beam over the plurality of pin-holes. The data acquisition device may also include hardware and/or software (e.g., blue tooth or the like) that enables the transmission of data to a receiver located outside of a laser processing enclosure.

Figure 8:
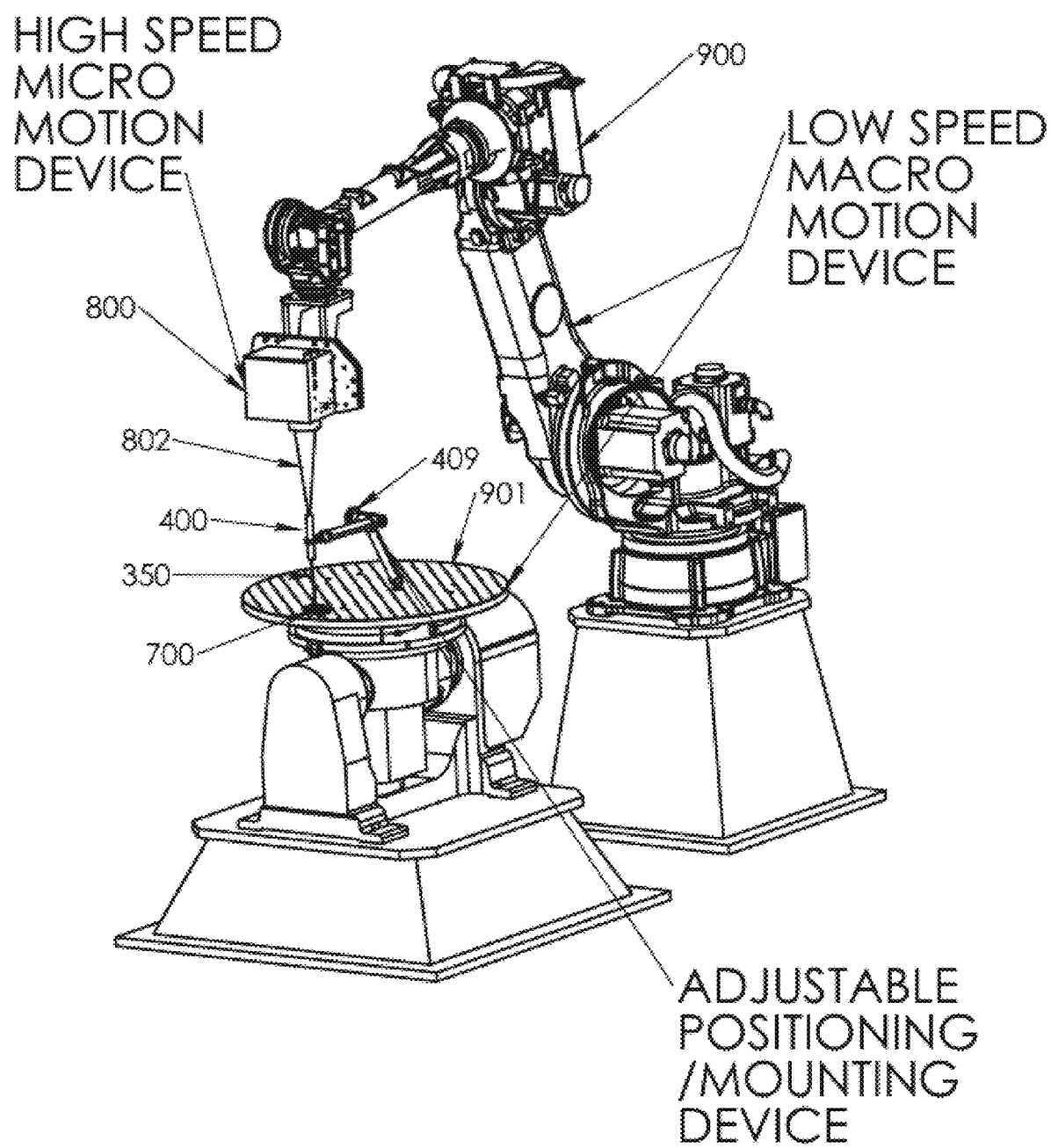
FIG. 8 is a perspective view of an example implementation of a single position testing apparatus for use with laser systems having high-speed motion capabilities, wherein a macro low-speed motion device is shown having a micro high-speed motion device attached thereto.
Figure 9:
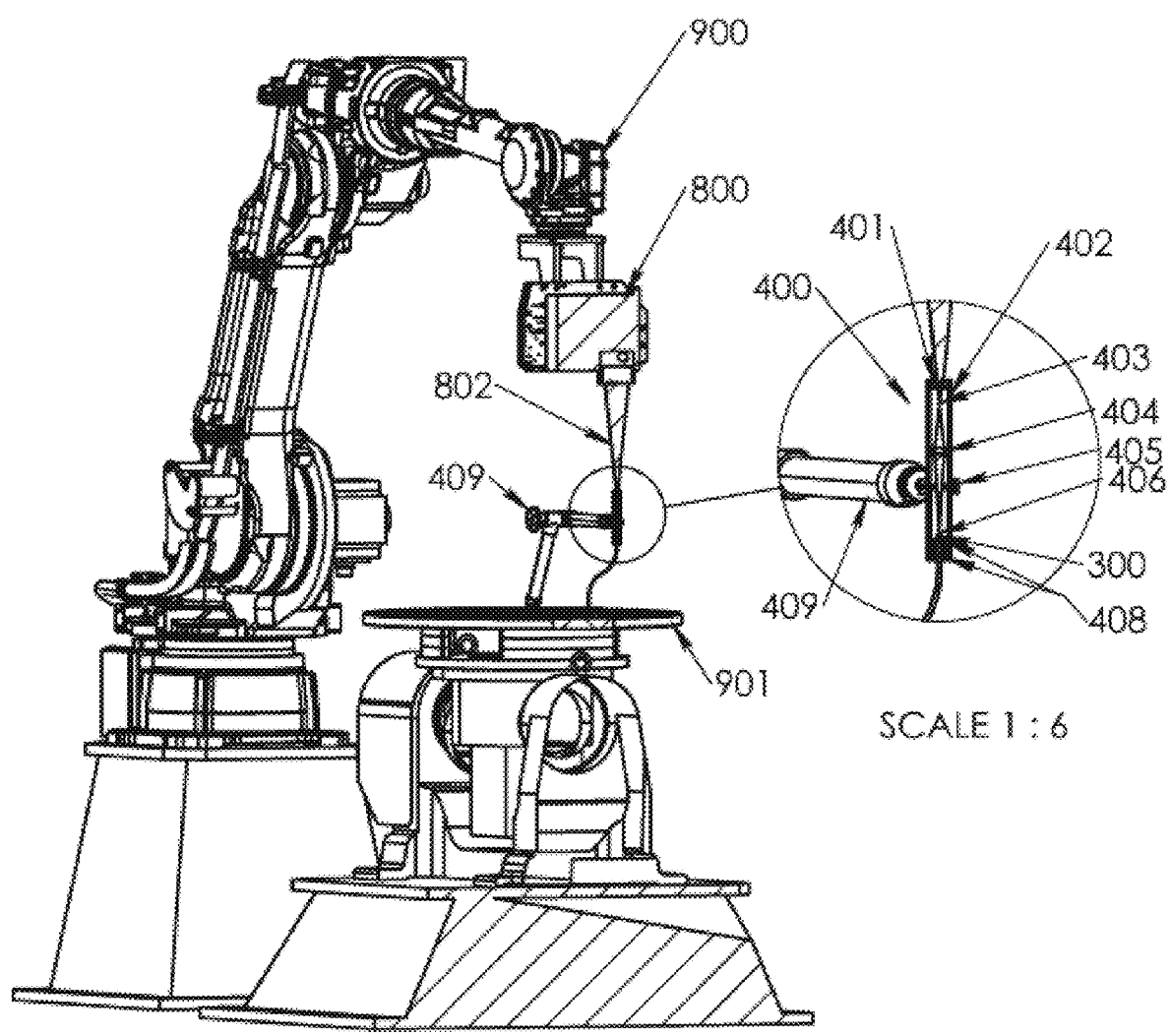
FIG. 9 is a partial cross-sectional view of the disclosed testing apparatus and associated components shown mounted to the processing table of a laser processing system and receiving laser light from a laser beam being analyzed by the disclosed testing apparatus.
Figure 11:
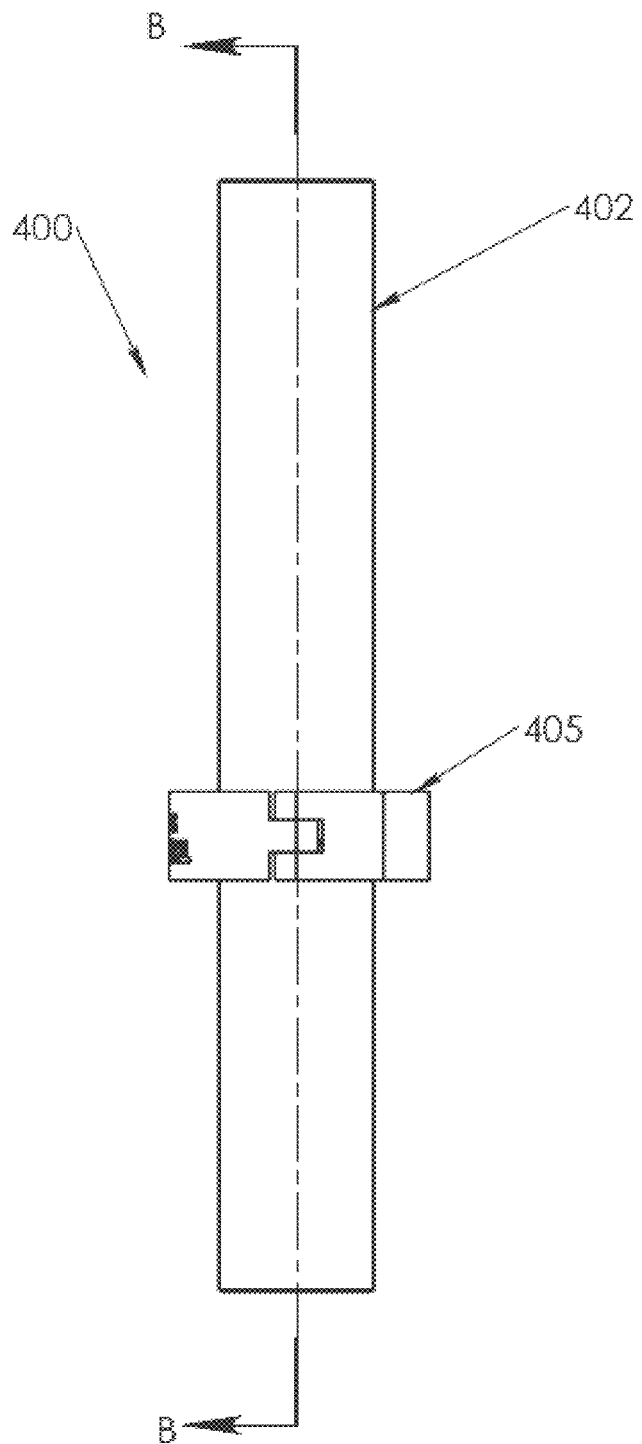
FIG. 11 is a side view of the disclosed example testing apparatus shown with a mounting clamp attached thereto for locating or positioning the testing apparatus relative to the laser beam to be analyzed.

FIGS. 8-12 depict testing apparatus 400 being used to analyze the characteristics of a non-stationary laser beam generated by a laser source present in a laser processing system. FIG. 8 provides a perspective view of an example implementation of a single position testing apparatus for use with laser systems having high-speed motion capabilities, wherein a macro low-speed motion device is shown having a micro high-speed motion device attached thereto. FIG. 9 provides a partial cross-sectional view of testing apparatus 400 and associated components shown mounted to the processing table of a laser processing system and receiving laser light from a laser beam being analyzed by the disclosed testing apparatus. FIG. 10 provides a diagram depicting an example laser beam path created by or performed by the motion system or beam manipulation system associated with a laser processing system for allowing the disclosed testing apparatus to analyze the laser beam generated by the laser processing system. FIG. 11 provides a side view of the disclosed testing apparatus shown with a mounting clamp attached thereto for locating or positioning the testing apparatus relative to the laser beam to be analyzed. FIG. 12 provides a cross sectional view of the testing apparatus of FIG. 11 showing the pin-hole defining structure and associated components disposed within testing apparatus 400.

In FIGS. 8-9, a laser source emits a laser beam into micro high speed motion system 800 and directs laser beam 802, which contacts upper surface 401 of testing apparatus 400. During the normal operation of testing apparatus 400, laser beam 802 is continually manipulated at typical operating power for bringing all the laser beam delivery elements of the laser processing system up to normal operating temperature and functionality such that any misalignment of laser beam 802 or loss of laser focus quality may be detected.

The example implementation of testing apparatus 400 shown in the Figures includes a single pin-hole defining structure disposed within a single support tube. In other example implementations, the general size of testing apparatus 400 and the number of pin-hole defining structures 300 and corresponding pin-holes 302 may be increased. For example, five pedestals may be used for evaluating a full laser processing system work envelope. Accordingly, testing apparatus 400 is scalable and may be modified based on the size and type of laser processing system or device that is being analyzed. Testing apparatus 400 may be adapted for use with larger processing systems that include multiple beam manipulation devices, all of which must be calibrated to perform similarly while working on a single part.

The disclosed testing apparatus and testing technology may also be modified or adapted for use with many different types of laser processing systems. In one implementation, the outer body of testing apparatus 400 provides precision mounting for defining the location of the testing apparatus and its pin-hole locations when the system is placed within a laser processing cell. In another implementation, the location of each pin-hole is measured with a precision, traceable measurement device for determining the exact locations thereof on the plane that the pin-holes define. In another implementation, received electrical signals are reconstructed programmatically to build a two-dimensional image of laser intensity and analyzed using machine vision principles to measure laser spot size and shape characteristics. In another implementation, known distances between test apparatuses can be used to determine the velocity of the non-stationary laser beam as it translates from test apparatus to test apparatus at different locations and directions on the laser processing work plane.

With reference to FIG. 10, in one implementation, a plurality of laser tracks is manipulated over each pin-hole 302 at a step width that is less than the expected laser beam diameter and the resultant electrical signals are acquired using a data acquisition device at an acquisition rate of greater than 50 kHz. In another implementation, acquired electrical signals are streamed to onboard memory within the chamber of a laser processing system and transferred wirelessly to a data acquisition device. Acquired electrical signals are reconstructed programmatically to build a three-dimensional representation of laser intensity and analyzed using machine vision principles to measure three laser beam characteristics: laser beam quality (millimeters×milliradians), focal spot diameter (μm), and Rayleigh length (μm). In another implementation, a non-stationary laser beam (at typical or standard operational power) is delivered along a predefined track on support 901 continuously for a predetermined period of time prior to manipulation of the laser beam over the pin-hole(s) for measuring any resultant changes in laser focal spot characteristics that may be induced during actual operation of the laser system. In another implementation, testing apparatus 400 is manipulated in vertical step increments using the laser processing motion system axis to acquire data about the non-stationary laser beam, relative to the nominal work plane location. In still another implementation, a spatial map of laser power compensation factors is calculated based on measured laser beam characteristics and implemented within the laser position controller for position-based laser power control.

With reference to FIGS. 11-12, exemplary testing apparatus 400 includes support tube 402; pin-hole defining structure or pedestal 300, which is mounted in support tube 402; and two locating rings 408 for receiving pin-hole defining structure 300 within support tube 402 and fixing its location therein. Support tube 402 also includes cover window 401 for protecting components located inside support tube 402; and reimaging lens 404 for adjusting the size of the laser spot for the measurement thereof. Mounting clamp 405 allows testing apparatus 400 to be attached to a mounting location or positioning device.

Figure 13:
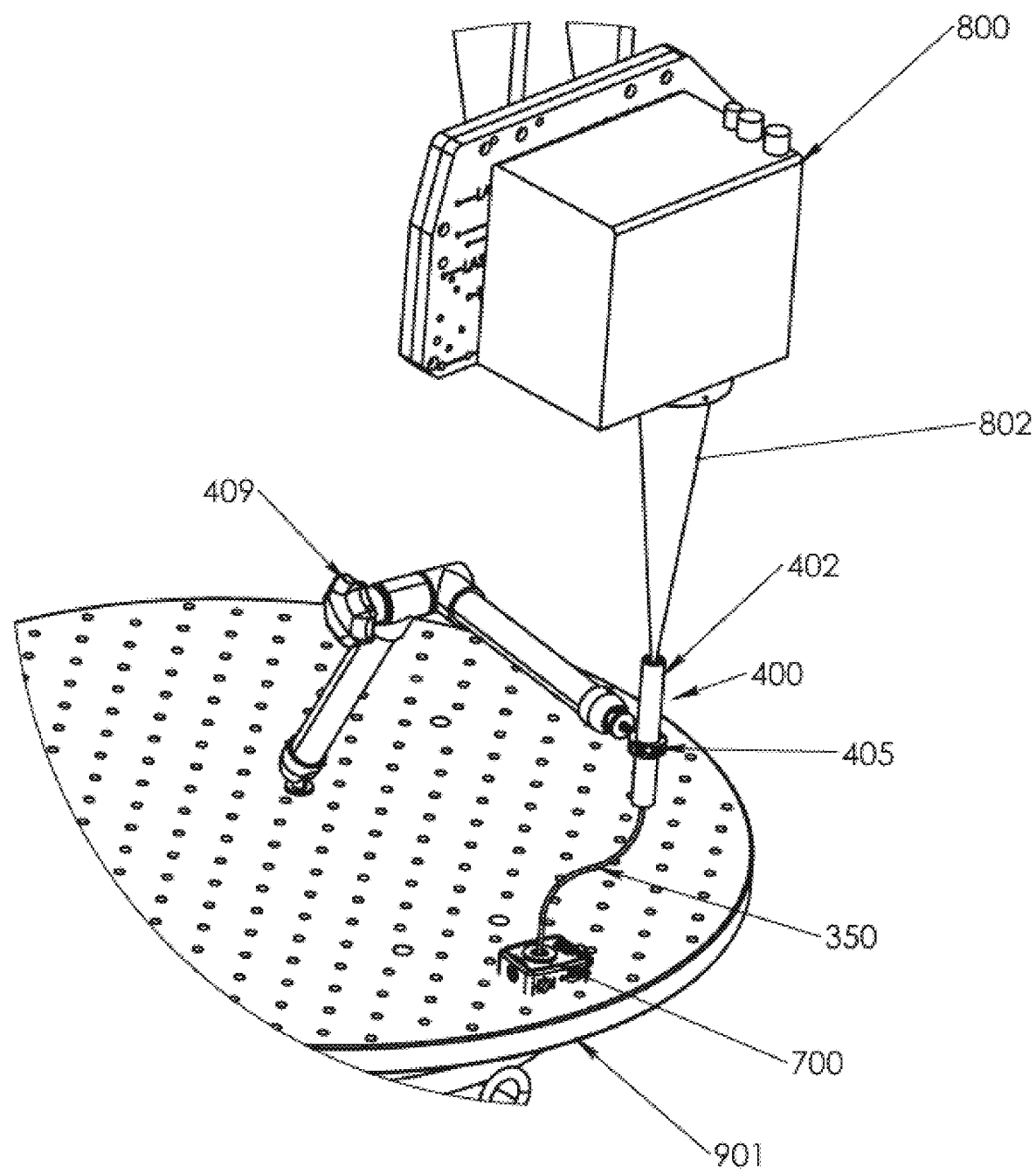
FIG. 13 is a detail of the system shown in FIG. 8, wherein the testing apparatus has been connected to a photo diode using a fiber optic cable.

As shown in FIG. 13 testing apparatus 400 is connected to mounting clamp 405 to allow connection of testing apparatus 400 to other devices for desired positioning. Adjustable positioning device 409 is used to connect mounting clamp 405 to work plane table 901 which supports photodetector 700 located near testing apparatus 400. Fiber optic cable 350 connects pin-hole defining structure 300, which is mounted inside support tube 402, to photodetector 700.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about" used throughout this specification are used to describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed inventive subject matter. Various functions and elements described herein may be partitioned differently from those shown without departing from the scope of the disclosed inventive subject matter. Generic principles defined herein may be applied to other implementations. Different numbers of a given module or unit may be employed, a different type or types of a given module or unit may be employed, a given module or unit may be added, or a given module or unit may be omitted.

It should be appreciated that all combinations of the foregoing concepts and additional concepts discussed in greater detail herein (provided such concepts are not mutually inconsistent) are contemplated as being part of the disclosed inventive subject matter. In particular, all combinations of claimed subject matter appearing at the end of this disclosure are contemplated as being part of the inventive subject matter disclosed herein. While the disclosed inventive subject matter has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed inventive subject matter in its broader aspects is not limited to any of the specific details, representative devices and methods, and/or illustrative examples shown and described. Accordingly, departures may be made from such details without departing from the spirit or scope of the general inventive concept.

What is claimed:

1. A testing apparatus for use with a laser processing systems, wherein the laser system includes a laser for generating a non-stationary laser beam and a work plane positioned at a working distance relative to the non-stationary laser beam, and wherein the testing apparatus comprises:
   (a) a support tube;
   (b) a light-transmitting protective window mounted in an upper portion of the support tube for protecting components mounted within the support tube;
   (c) a reimaging lens mounted in a middle portion of the support tube for enlarging the non-stationary laser beam for measurement thereof;
   (d) a pin-hole defining structure mounted in a lower portion of the support tube for receiving laser light generated by the non-stationary laser beam, wherein the pin-hole is located at a predetermined distance from the reimaging lens, and wherein the predetermined distance is calibrated to permit analysis of the laser beam;
   (e) a fiber optic cable disposed within the pin-hole defining structure, wherein the fiber optic cable has a proximal end at which the laser light is received through the pin-hole and a distal end to which the laser light is delivered; and
   (f) a photodetector located at the distal end of the fiber optic cable, wherein the photodetector converts the laser light delivered to the photodetector into electrical voltage output signals based on intensity of the laser light received through the pin-hole.

2. The testing apparatus of claim 1, further comprising a fixed or an adjustable mounting device adapted to receive the support tube and reposition the support tube on the work plane.

3. The testing apparatus of claim 1, further comprising a data acquisition device in communication with the photodetector, wherein the data acquisition device receives, saves, organizes, and analyzes the electrical signals as a function of time, or time and position, relative to the pin-hole through which the laser light was received.

4. The testing apparatus of claim 2, further comprising a data analysis algorithm associated with the data acquisition device that calculates and determines laser beam quality based on data acquired from multiple passes of the non-stationary laser beam over the pin-hole.

5. The testing apparatus of claim 1, wherein the pin-hole has a diameter and wherein the diameter of the pin-hole is one third to one-thirtieth the diameter of the laser beam being characterized.

6. The testing apparatus of claim 1, wherein the pin-hole defining structure includes at least one highly-reflective material for minimizing damage to the pin-hole and pin-hole defining structure caused by absorption of energy from the laser.

7. The testing apparatus of claim 6, wherein the at least one highly-reflective material includes gold, copper, or other reflective metal or metal coating.

8. A testing apparatus for use with a laser processing systems, wherein the laser system includes a laser for generating a non-stationary laser beam and a work plane positioned at a working distance relative to the non-stationary laser beam, and wherein the testing apparatus comprises:
   (a) at least one support tube;
   (b) a light-transmitting protective window mounted in an upper portion of each support tube for protecting components mounted within the support tube;
   (c) a reimaging lens mounted in a middle portion of each support tube for enlarging the non-stationary laser beam for measurement thereof;
   (d) a pin-hole defining structure mounted in a lower portion of each support tube for receiving laser light generated by the non-stationary laser beam, wherein the pin-hole is located at a predetermined distance from the reimaging lens, and wherein the predetermined distance is calibrated to permit analysis of the laser beam;
   (e) a fiber optic cable disposed within each pin-hole defining structure, wherein the fiber optic cable has a proximal end at which the laser light is received through the pin-hole and a distal end to which the laser light is delivered;
   (f) a photodetector located at the distal end of each fiber optic cable, wherein the photodetector converts the laser light delivered to the photodetector into electrical voltage output signals based on intensity of the laser light received through each pin-hole; and (g) a fixed or an adjustable mounting device adapted to receive each support tube and reposition the support tube on the work plane.

9. The testing apparatus of claim 8, further comprising a data acquisition device in communication with each photodetector, wherein the data acquisition device receives, saves, organizes, and analyzes the electrical signals as a function of time, or time and position, relative to the pin-hole through which the laser light was received.

10. The testing apparatus of claim 9, further comprising a data analysis algorithm associated with the data acquisition device that calculates and determines laser beam quality based on data acquired from multiple passes of the non-stationary laser beam over each pin-hole.

11. The testing apparatus of claim 8, wherein each pin-hole has a diameter and wherein the diameter of each pin-hole is one third to one-thirtieth the diameter of the laser beam being characterized.

12. The testing apparatus of claim 8, wherein each pin-hole defining structure includes at least one highly-reflective material for minimizing damage to the pin-hole and pin-hole defining structure caused by absorption of energy from the laser.

13. The testing apparatus of claim 12, wherein the at least one highly-reflective material includes gold, copper, or other reflective metal or reflective coating.

14. A testing apparatus for use with a laser processing systems, wherein the laser system includes a laser for generating a non-stationary laser beam and a work plane positioned at a working distance relative to the non-stationary laser beam, and wherein the testing apparatus comprises:

(a) at least one support tube;

(b) a light-transmitting protective window mounted in an upper portion of each support tube for protecting components mounted within the support tube;

(c) a reimaging lens mounted in a middle portion of each support tube for enlarging the non-stationary laser beam for measurement thereof;

(d) a pin-hole defining structure mounted in a lower portion of each support tube for receiving laser light generated by the non-stationary laser beam, wherein the pin-hole is located at a predetermined distance from the reimaging lens, and wherein the predetermined distance is calibrated to permit analysis of the laser beam;

(e) a fiber optic cable disposed within each pin-hole defining structure, wherein the fiber optic cable has a proximal end at which the laser light is received through the pin-hole and a distal end to which the laser light is delivered;

(f) a photodetector located at the distal end of each fiber optic cable, wherein the photodetector converts the laser light delivered to the photodetector into electrical voltage output signals based on intensity of the laser light received through each pin-hole; and (g) a data acquisition device in communication with each photodetector, wherein the data acquisition device receives, saves, organizes, and analyzes the electrical signals as a function of time, or time and position, relative to the pin-hole through which the laser light was received.

15. The testing apparatus of claim 14, further comprising a fixed or an adjustable mounting device adapted to receive each support tube and reposition the support tube on the work plane.

16. The testing apparatus of claim 14, further comprising a data analysis algorithm associated with the data acquisition device that calculates and determines laser beam quality based on data acquired from multiple passes of the non-stationary laser beam over each pin-hole.

17. The testing apparatus of claim 14, wherein each pin-hole has a diameter and wherein the diameter of each pin-hole is one third to one-thirtieth the diameter of the laser beam being characterized.

18. The testing apparatus of claim 14, wherein each pin-hole defining structure includes at least one highly-reflective material for minimizing damage to the pin-hole and pin-hole defining structure caused by absorption of energy from the laser.

19. The testing apparatus of claim 18, wherein the at least one highly-reflective material includes gold, copper, or other reflective metal or reflective coating.

* * * * *